United States Patent
Eckart et al.

(10) Patent No.: US 10,343,623 B2
(45) Date of Patent: Jul. 9, 2019

(54) DOOR FRAME OF A MOTOR VEHICLE

(71) Applicant: Dr. Ing. h.c. F. Porsche Aktiengesellschaft, Stuttgart (DE)

(72) Inventors: Gerald Eckart, Majerhoefen (DE); Thomas Seibold, Ostfildern (DE); Claudius Kuebart, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/701,782

(22) Filed: Sep. 12, 2017

(65) Prior Publication Data

US 2018/0072243 A1 Mar. 15, 2018

(30) Foreign Application Priority Data

Sep. 12, 2016 (DE) .......... 10 2016 117 057

(51) Int. Cl.
*B60R 13/02* (2006.01)
*B60J 5/04* (2006.01)

(52) U.S. Cl.
CPC .......... *B60R 13/0206* (2013.01); *B60J 5/04* (2013.01); *B60R 13/0243* (2013.01)

(58) Field of Classification Search
CPC ........ E05Y 2900/132; E05Y 2900/531; B27M 3/18; B65D 83/267; E05B 83/10; E05B 85/243; B60R 21/2165; B60R 21/207; B60R 21/215; A45C 9/00
USPC ...................... 296/146.5, 146.1, 146.7, 146.9
See application file for complete search history.

(56) References Cited

U.S. PATENT DOCUMENTS

| 5,345,721 | A | * | 9/1994 | Stein | B60J 5/0468 296/146.7 |
| 5,431,433 | A | * | 7/1995 | Steimke | B60R 21/216 280/728.3 |
| 6,213,537 | B1 | * | 4/2001 | Butz | B60J 5/0404 248/479 |
| 6,412,852 | B1 | * | 7/2002 | Koa | B60R 13/0206 296/146.5 |
| 7,904,994 | B2 | * | 3/2011 | Girodo | B60R 13/0206 24/297 |
| 8,844,992 | B1 | * | 9/2014 | Noga | B60R 13/0206 24/289 |
| 8,910,987 | B1 | * | 12/2014 | Greggs | B60R 13/04 296/1.08 |
| 9,403,492 | B1 | * | 8/2016 | Greggs | B62D 25/00 |
| 2003/0000048 | A1 | | 1/2003 | Boville | |

(Continued)

FOREIGN PATENT DOCUMENTS

| DE | 199 63 721 | 7/2001 |
| DE | 10 2004 029 865 | 8/2005 |

(Continued)

OTHER PUBLICATIONS

German Search Report dated May 30, 2017.

*Primary Examiner* — Kiran B Patel
(74) *Attorney, Agent, or Firm* — Gerald E. Hespos; Michael J. Porco; Matthew T. Hespos

(57) ABSTRACT

A door frame (1) of a motor vehicle has a cover panel (10) fastened on the door frame (1). To simplify the fastening of the cover panel (10) on the door frame (1), the cover panel (10) has a guiding and positioning protrusion that positions the cover panel (10) without rattling on the door frame (1) in an installation direction.

9 Claims, 2 Drawing Sheets

(56) References Cited

U.S. PATENT DOCUMENTS

| | | | | |
|---|---|---|---|---|
| 2007/0079568 A1* | 4/2007 | Butz | ...................... | B60J 5/0416 |
| | | | | 52/301 |
| 2010/0034581 A1* | 2/2010 | Hirose | ................... | B60J 5/0468 |
| | | | | 403/286 |
| 2010/0133875 A1* | 6/2010 | Bouillon | ............. | B60R 13/0206 |
| | | | | 296/187.01 |
| 2011/0302765 A1* | 12/2011 | Marx | .................. | B60R 13/0206 |
| | | | | 29/525.01 |
| 2014/0217773 A1* | 8/2014 | Shimizu | ................ | B60J 5/0402 |
| | | | | 296/146.6 |
| 2014/0284962 A1* | 9/2014 | Mally | ................... | F16B 5/0657 |
| | | | | 296/146.7 |
| 2016/0001646 A1* | 1/2016 | Yamada | ................... | B60J 10/75 |
| | | | | 52/716.5 |
| 2018/0072243 A1* | 3/2018 | Eckart | ...................... | B60J 5/04 |

FOREIGN PATENT DOCUMENTS

| | | |
|---|---|---|
| DE | 10 2007 024 149 | 11/2008 |
| DE | 10 2008 061 613 | 7/2010 |
| DE | 10 2010 056 412 | 6/2012 |

* cited by examiner

DOOR FRAME OF A MOTOR VEHICLE

CROSS REFERENCE TO RELATED APPLICATION

This application claims priority under 35 USC 119 to German Patent Appl. No. 10 2016 117 057.7 filed on Sep. 12, 2016, the entire disclosure of which is incorporated herein by reference.

BACKGROUND

1. Field of the Invention

The invention relates to a door frame of a motor vehicle, having a cover panel that is fastened on the door frame. The invention also relates to a method of installing a cover panel on such a door frame.

2. Description of the Related Art

US 2014/0217773 A1 discloses a side frame that comprises inner and outer frame portions. DE 10 2007 024 149 B4 discloses a motor vehicle with a body with opposite left and right side frames provided with door-cutout openings and doors that are pivotable in the respective door-cutout opening. A window frame is formed on each door, and a column panel is fastened on each window-frame portion of the respective door. The two column panels between a front door and a rear door conceal the body pillar located behind the column panels.

The object of the invention is to simplify the fastening of a cover panel on a door frame.

SUMMARY

The invention relates to a door frame of a motor vehicle. A cover panel is fastened on the door frame and has a guiding and positioning protrusion that positions the cover panel without rattling on the door frame in an installation direction. The cover panel may be a rear frame-cover part. The guiding and positioning protrusion reduces the number of screw-connection locations on the cover panel and simplifies the installation of the cover panel on the door frame.

The guiding and positioning protrusion may guide the cover panel on the door frame in the installation direction, thereby facilitating the installation of the cover panel on the door frame. Furthermore, the guiding and positioning protrusion prevents incorrect installation of the cover panel on the door frame.

The guiding and positioning protrusion may have a hook-like profile that is configured so that the guiding and positioning protrusion fits snugly into a corresponding aperture on the door frame. The configuration of the aperture is adapted to the configuration of the guiding and positioning protrusion so that, during installation, the guiding and positioning protrusion engages with guidance in the aperture. The guiding and positioning protrusion strikes against an end portion of the corresponding aperture on the door frame as soon as a desired installation position has been reached. The striking action defines the correct installation position of the cover panel on the door frame. The cover panel that has reached the correct installation position can be fastened on the door frame, for example via additional screw-connection elements.

The corresponding aperture may be provided on a hollow profile of the door frame. The hollow profile may have an essentially rectangular profile cross section. The door frame with the hollow profile may be formed from a sheet-metal material, such as an aluminum sheet.

A supporting body may be provided on the cover panel at a location spaced apart from the guiding and positioning protrusion. The supporting body is configured to support the cover panel on the door frame in a y direction. A longitudinal direction of the vehicle also is referred to as the x direction, while a transverse direction of the vehicle also is referred to as the y direction. The supporting body constitutes a spacer for the cover panel relative to the door frame in the transverse direction of the vehicle.

The cover panel may have at least two screw-connection locations that receive screws for fastening the cover panel on the door frame. The cover panel may comprise a total of three screw-connection locations in addition to the guiding and positioning protrusion. During installation, the cover panel initially may be positioned on the door frame with the aid of the guiding and positioning protrusion. The cover panel then may be secured releasably on the door frame by screws. Thus, the cover panel can be removed from the door frame in a non-destructive manner, if required.

The door frame may be for a rear door of the motor vehicle. The C pillar delimits a window opening in the rearward direction in the door frame. The cover panel may be C-pillar panel and may be installed on the door frame from the outside.

The guiding and positioning protrusion may be at a lower end of the cover panel, with lower end being arranged between the door frame and a frame-reinforcement part. The end of the cover panel with the guiding and positioning protrusion cannot be seen when the vehicle door is installed. Thus, the hollow profile that has the aperture for accommodating the hook-like profile of the guiding and positioning protrusion may be open, thereby facilitating production of the door frame.

The invention also relates to a cover panel for the above-described door frame. The cover panel can be handled separately. The cover panel may be formed from plastic and be an injection molded component. Thus, the guiding and positioning protrusion may be unitary with the cover panel. The supporting body also may be unitary with the cover panel. Unitary, in this context, means a single continuous matrix of the plastic resin material. This makes it considerably easier to produce the cover panel.

The invention also relates to a motor vehicle having a door frame described above.

The invention also relates to a method for installing a cover panel on a door frame, as described above. The method includes using the guiding and positioning protrusion for positioning the cover panel without rattling on the door frame before the cover panel is fastened on the door frame. The cover panel advantageously is fastened on the door frame in a releasable manner so that the cover panel can be separated repeatedly in a non-destructive manner. The releasable fastening of the cover panel on the door frame may use screws in addition to the guiding and positioning protrusion.

Further advantages and details of the invention can be gathered from the following description and the drawings.

DETAILED DESCRIPTION

Figure 1:
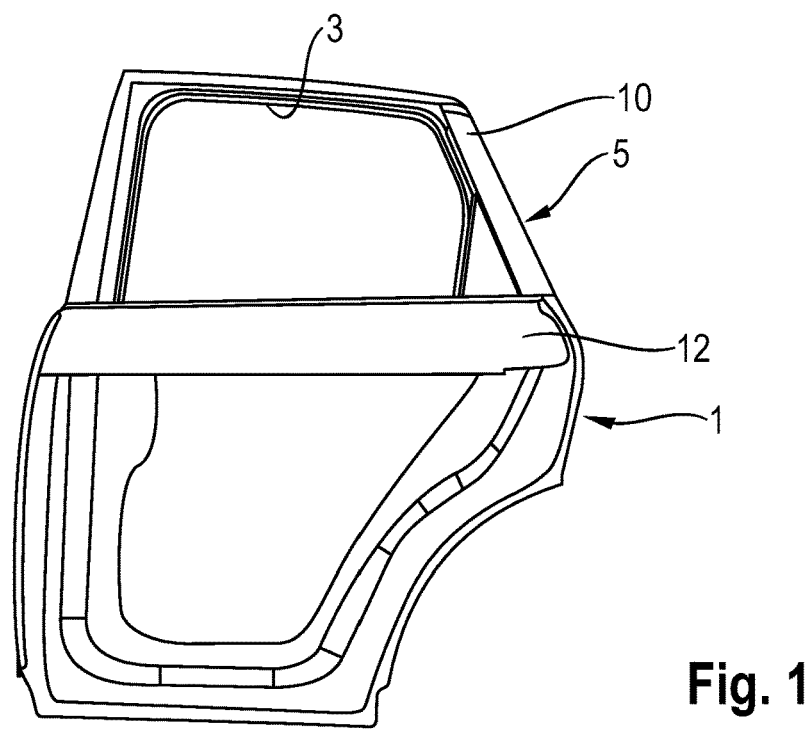
FIG. 1 is a perspective illustration of a motor-vehicle door frame, on which a cover panel and a frame-reinforcement part are installed.

FIG. 1 is a perspective illustration of a door frame 1 arranged at the rear of the left side of the motor vehicle. The door frame 1 has a window cutout 3 that is delimited in the rearward direction by a C pillar 5.

A cover panel 10 is fastened on the C pillar 5 of the door frame 1 from the outside, and hence also can be referred to as a C-pillar panel 10. A frame-reinforcement part 12 is fastened on the door frame 1 beneath the window cutout 3 and conceals a lower end portion of the cover panel 10. The frame-reinforcement part 12 is, for example, an external channel or duct reinforcement.

Figure 2:
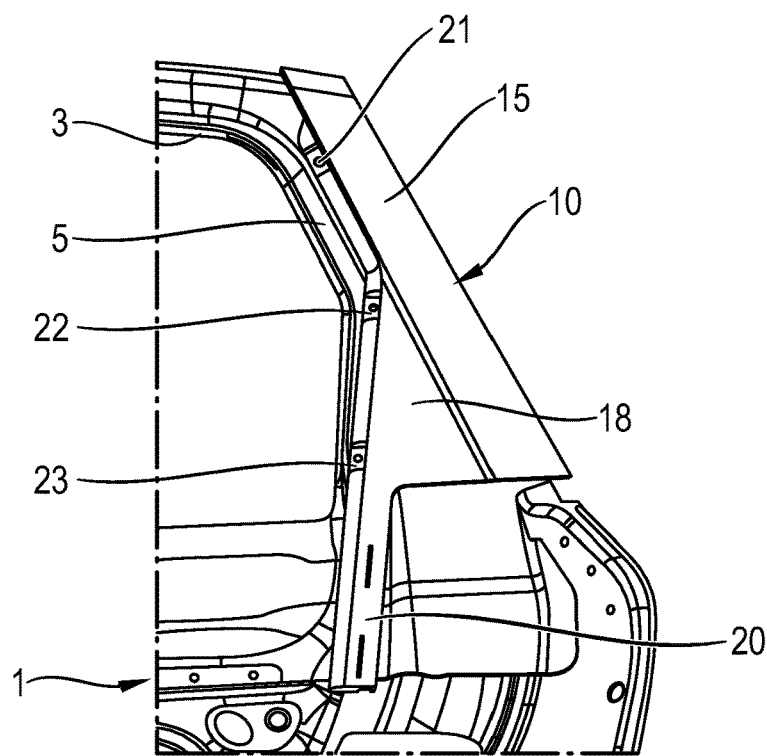
FIG. 2 is a detail from FIG. 1 with the cover panel, but without the frame-reinforcement part.

FIG. 2 illustrates on an enlarged scale a detail from FIG. 1 with the cover panel 10, but without the frame-reinforcement part 12. The cover panel 10 comprises an elongate main body 15 that is connected to an end 20 of the cover panel 10 in one piece via a triangular connecting body 18. When the frame-reinforcement part 12 is in the installed state, as seen in FIG. 1, the end 20 of the cover panel 10 is concealed by the frame-reinforcement part 12.

The cover panel 10 is injection molded from plastic, while the door frame 1 is formed from a sheet metal material, such as an aluminum sheet material.

The cover panel 10 has a total of three screw-connection locations 21, 22, 23 that receive screws for fastening the cover panel 10 on the door frame 1. The screw-connection location 21 is provided on the elongate main body 15 of the cover panel 10. The two screw-connection locations 22 and 23 are provided on the triangular connecting body 18 of the cover panel 10.

Figure 3:
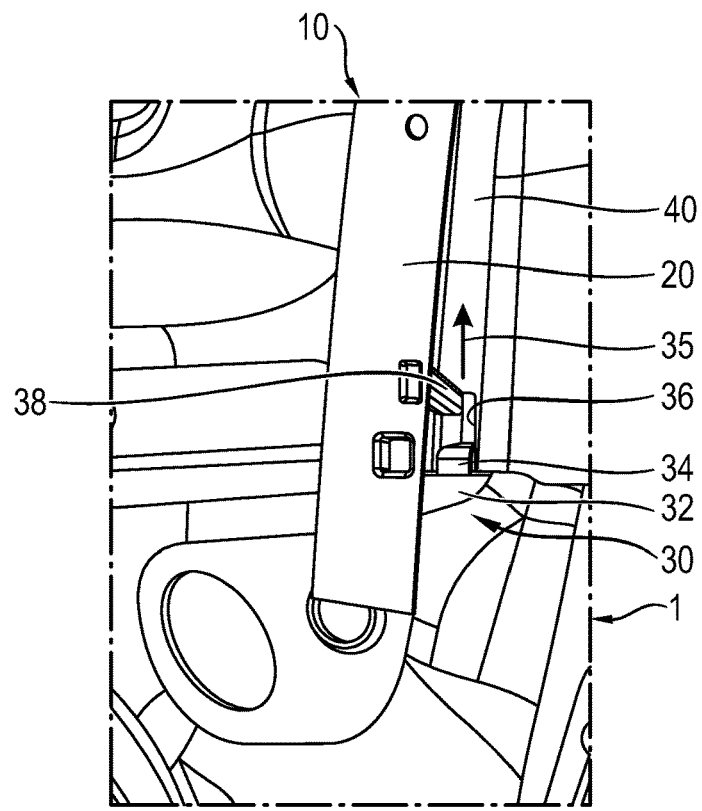
FIG. 3 is an enlarged detailed from FIG. 2 during installation of the cover panel with the aid of a guiding and positioning protrusion.
Figure 4:
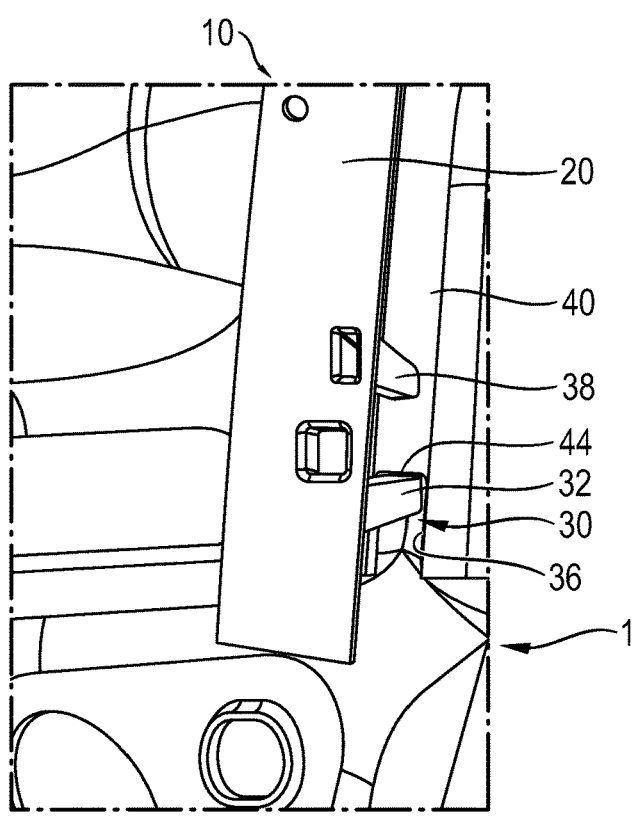
FIG. 4 is a detail similar to FIG. 3 showing the guiding and positioning protrusion striking against an end portion of an aperture in a hollow profile of the door frame.

FIGS. 3 and 4 show that a guiding and positioning protrusion 30 is provided at the end 20 of the cover panel 10. Starting from the end 20 of the cover panel 10, the guiding and positioning protrusion 30 projects essentially perpendicularly from said end. The guiding and positioning protrusion 30 has a hook-like profile 32 that defines a step 34.

An arrow 35 is used in FIG. 3 to indicate an installation direction. During installation, the guiding and positioning protrusion 30 is introduced into an aperture 36 in the installation direction 35. The aperture 36 is provided on a hollow profile 40 of the door frame 1 and has an essentially rectangular cross section.

A supporting body 38 is formed at the end 20 of the cover panel 10, in FIGS. 3 and 4 above the guiding and positioning protrusion 30. The supporting body 38 projects essentially perpendicularly from the end 20 of the cover panel 10.

During installation, the cover panel 10 is supported on the hollow profile 40 of the door frame 1 by way of the supporting body 38.

FIG. 3 shows that the guiding and positioning protrusion 30 is guided in the aperture 36 during installation of the cover panel 10. During installation, the cover panel 10 is moved up in the installation direction 35, by way of the guiding and positioning protrusion 30, until the guiding and positioning protrusion 30 strikes against an end portion 44 of the aperture 36 in the region of the step 34, as can be seen in FIG. 4.

The hook-like profile 32 of the guiding and positioning protrusion 30 advantageously engages in the hollow profile 40 by way of the step 34. During and following installation, the cover panel 10 is supported externally on the hollow profile 40, by way of the supporting body 38, in the y direction, which is the transverse direction of the vehicle.

As soon as the correct installation position of the cover panel 10 has been reached, as shown in FIG. 4, the cover panel 10 can be fixed by screws at the screw-connection locations (21 to 23 in FIG. 2).

What is claimed is:

1. A door frame (1) of a motor vehicle, comprising a cover panel (10) fastened on the door frame (1), the cover panel (10) having a guiding and positioning protrusion (30) that positions the cover panel (10) without rattling on the door frame (1) in an installation direction (35).

2. The door frame of claim 1, wherein the guiding and positioning protrusion (30) is configured for guiding the cover panel (10) on the door frame (1) in the installation direction (35).

3. The door frame of claim 1, wherein the door frame (1) has an aperture (36), and the guiding and positioning protrusion (30) has a hook-like profile (32) that fits snugly into the aperture (36) on the door frame (1).

4. The door frame of claim 3, wherein the aperture (36) is provided on a hollow profile (40) of the door frame (1).

5. The door frame of claim 1, further comprising a supporting body (38) on the cover panel (10), the supporting body (38) being spaced from the guiding and positioning protrusion (30) and supporting the cover panel (10) on the door frame (1) in a y direction.

6. The door frame of claim 1, wherein the cover panel (10) has at least two screw-connection locations (21-23) for fastening the cover panel (10) on the door frame.

7. The door frame of claim 1, wherein the cover panel (10) is a C-pillar panel.

8. The door frame of claim 1, wherein the guiding and positioning protrusion (30) is provided at a lower end (20) of the cover panel (10) and between the door frame (1) and a frame-reinforcement part (12).

9. A cover panel (10) for the door frame (1) of claim 1.

* * * * *